Oct. 5, 1954 P. J. MOORE 2,690,951
AUTOMATIC TAKE-UP FOR REVERSIBLE CHART DRIVE
Filed Nov. 12, 1948 3 Sheets-Sheet 1
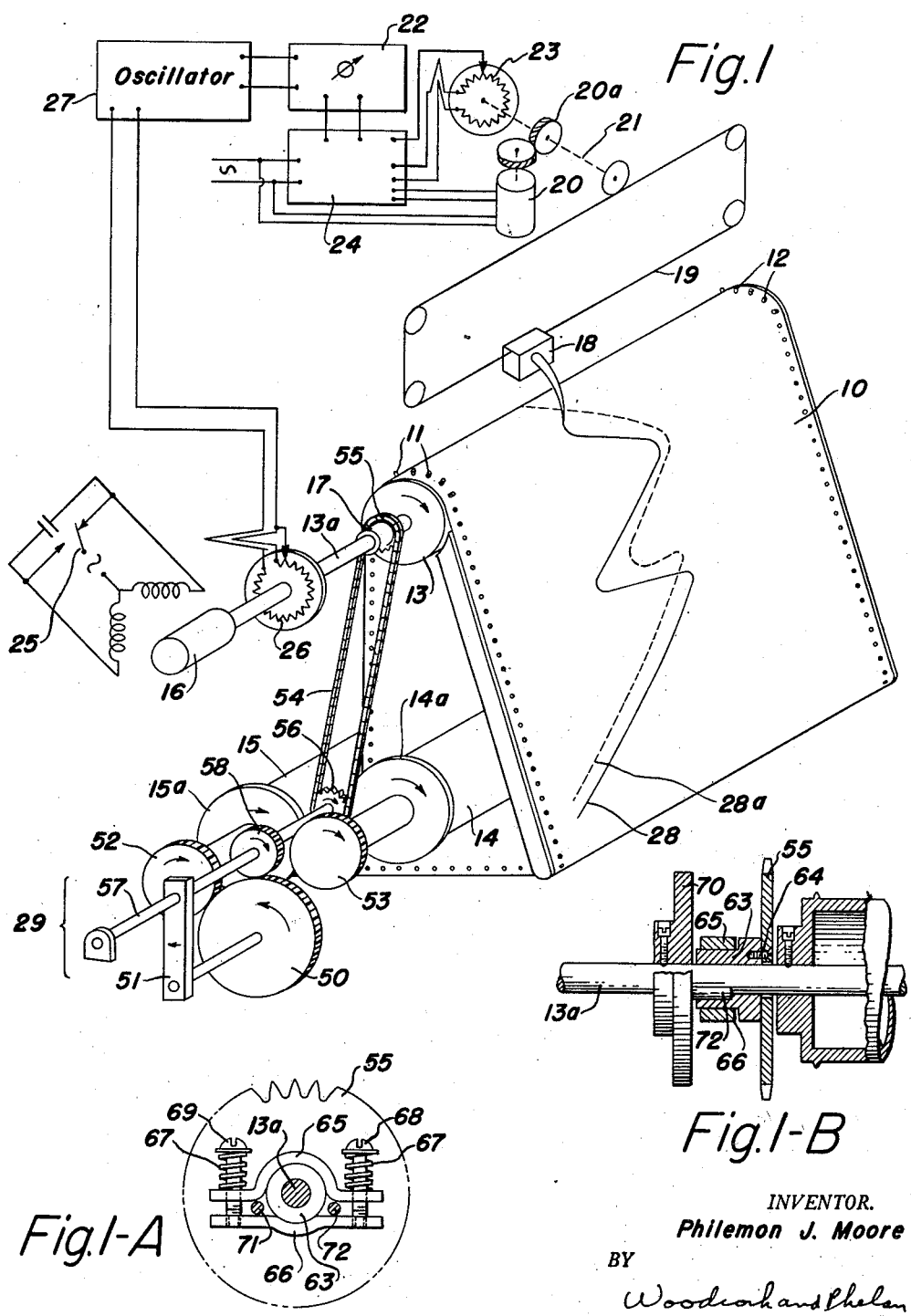
INVENTOR.
Philemon J. Moore
BY
Woodcock and Phelan
Attorneys

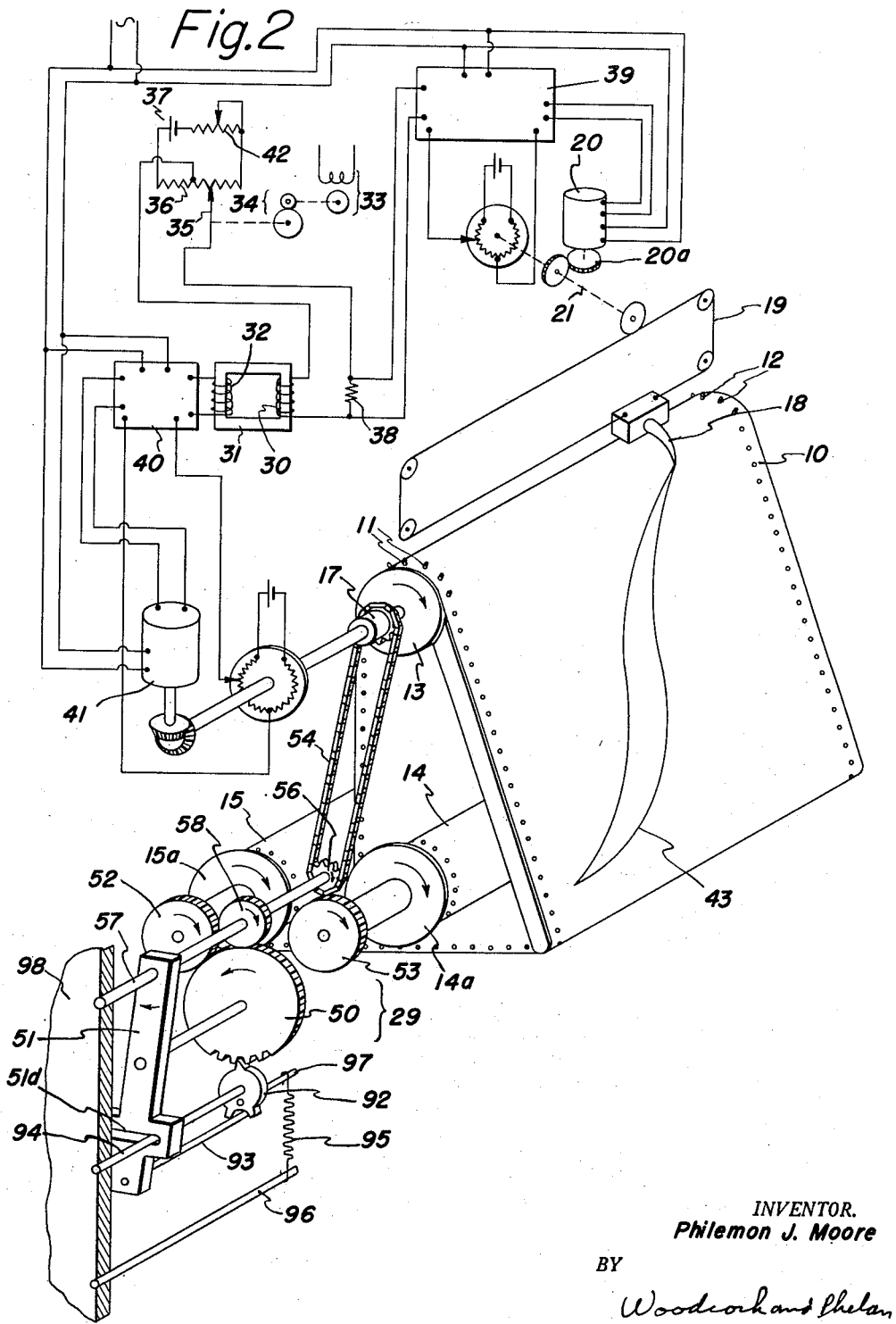

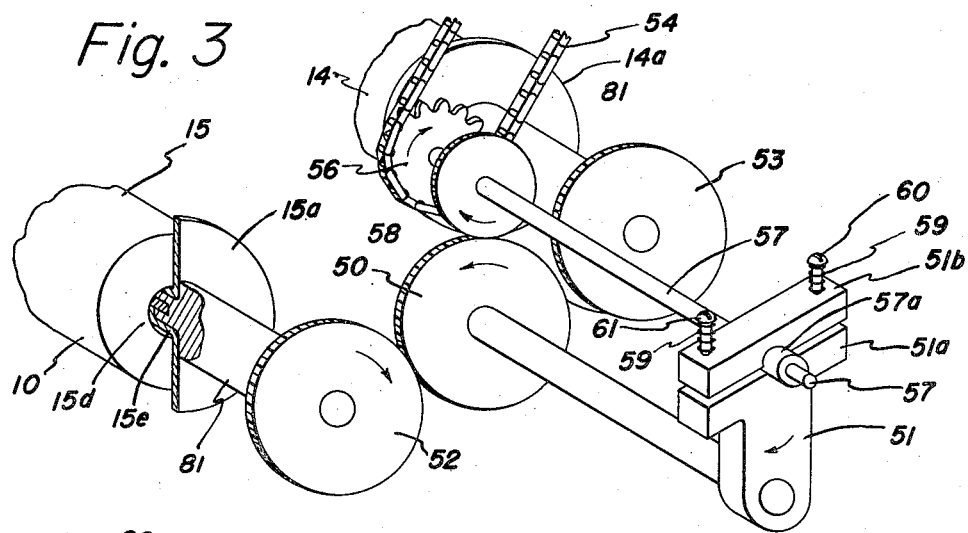
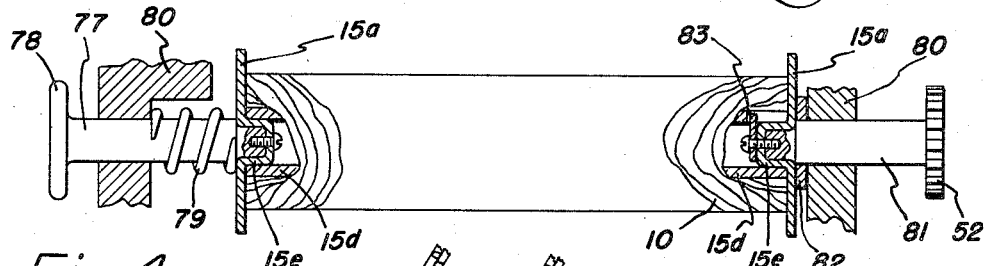
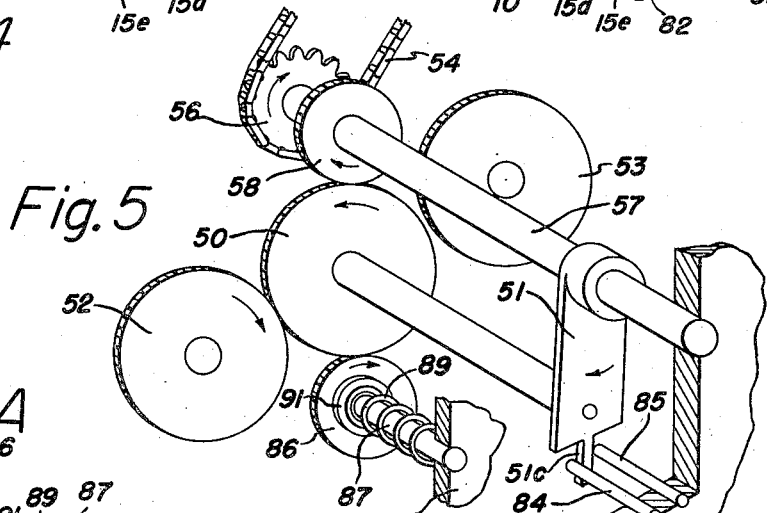
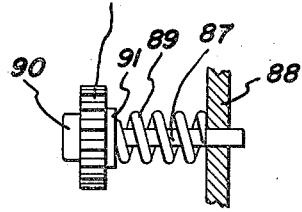

Patented Oct. 5, 1954

2,690,951

UNITED STATES PATENT OFFICE 2,690,951

AUTOMATIC TAKE-UP FOR REVERSIBLE CHART DRIVE

Philemon J. Moore, Glenside, Pa., assignor to Leeds and Northrup Company, Philadelphia, Pa., a corporation of Pennsylvania Application November 12, 1948, Serial No. 59,588

8 Claims. (Cl. 346—136)

This invention relates to a control mechanism, more particularly to recording instruments of the type in which a chart-driving roll may be selectively rotated in one direction or the other, and has for an object the provision of a selective driving mechanism which, in accordance with the direction of rotation of the chart-driving roll completes a driving connection to a takeup roll in avoidance of slack in the chart between the driving roll and the takeup roll and which mechanism upon reversal in the direction of rotation of the driving roll interchanges the function of the previously driven takeup roll and a supply roll, the latter then being driven as the takeup roll.

In a number of applications, it has been found desirable again to trace on a given length of chart additional records in order to afford more convenient visual comparison between successive records. For example, such an arrangement is particularly desirable if an investigation is undertaken of the characteristics of a frequency-responsive network and the objective is to obtain a predetermined characteristic curve by suitable variations in the circuit constants. In other applications, it is sometimes desirable to move a marking element relative to the chart in accordance with one variable condition and to move the chart relative to the marker in response to a different condition. In both of the foregoing cases, reversal of movement of the chart is necessary. With such reversal of movement of the chart, considerable difficulty has been experienced due to the occurrence of slack and the resulting tendency of the chart to lose its driving connection with the chart-driving roll.

In carrying out the present invention in one form thereof, there is provided a selective driving mechanism driven with or by the chart-driving roll and bodily movable selectively to engage a chart-supporting means to drive it in a direction for re-roll of the chart. Upon reversal of rotation of the chart-driving roll, the selective driving mechanism is automatically moved to a position to disengage its driving connection with the chart-supporting means, which theretofore was operated to re-roll the chart, and to engage another chart-supporting means to rotate it in the direction to re-roll the chart. There is automatic interchange of the functions of the supply roll support and the reroll support by positive drive of one or the other in the proper direction. There is thus avoided any slack in the chart and it is maintained taut in the region between the drive roll and the driven takeup roll. More particularly, the selective driving mechanism is bodily moved from one chart-driving position to another chart-driving position in accordance with the direction of rotation of the chart-driving means. The transfer mechanism includes a pivoted member movable from one driving position to another to move a driving means into selective engagement with one or the other of the chart-supporting means. The pivoted arm or member is actuated by a force frictionally developed or positively produced in a direction dependent upon the direction of rotation of said chart-driving means.

For a more detailed understanding of the invention and for further objects and advantages thereof, reference is to be had to the following description taken in conjunction with the accompanying drawings in which:

Fig. 1 diagrammatically illustrates a typical application of the invention;

Fig. 1–A is an end view of a frictional drive useful with each modification of the invention;

Fig. 1–B is a side elevation of Fig. 1–A;

Fig. 2 diagrammatically illustrates another typical application of the invention with one modification thereof shown in perspective;

Fig. 3 is a fractional perspective view of a recorder embodying another modification of the invention;

Fig. 4 is a sectional view showing the details of a chart-supporting and driving means including a driving gear;

Fig. 5 is a fractional perspective view of a recorder having applied thereto a further modification of the invention; and Fig. 5–A is a side elevation of a frictional drag shown in Fig. 5.

Referring to Fig. 1 of the drawings, the invention in one form has been broadly shown in a typical application where it functions automatically to interchange the supply and reroll functions of chart-supporting means in order to maintain the chart in effective driving engagement with the chart-driving roll or cylinder for either direction of rotation thereof. In Fig. 1, the chart 10 is threaded over driving pins 11 and 12 carried by the chart-driving roll or cylinder 13. The chart is fed from a feed roll 14 and is rewound on a takeup roll 15. Such supply rolls and takeup rolls may comprise drums though in typical commercial applications of the invention the charts are wound upon cores which, when applied to the recorder, are engaged by suitable chart-supporting flanges 14a, 15a which are pressed into cooperative relation with the respective ends of the cores.

In Fig. 1, it will be assumed that the chart-driving roll 13 is being driven by a reversible motor 16 in a clockwise direction. Accordingly, the takeup or reroll means 15 will be similarly driven in a clockwise direction in order to maintain taut that part of the chart extending between the chart-driving roll 13 and the reroll 15. The supply roll 14 need not be mechanically driven, the weight and friction involved being sufficient to maintain taut that part of the chart between driving roll 13 and supply roll 14. Since the diameters of rolls 14 and 15 will be changing, one growing less and the other growing larger, there is preferably provided a frictional drive 17 for the takeup roll, so that the chart will be maintained in slight tension throughout the operation and to assure that the chart will be snugly wound upon the takeup roll. The speed of rotation of the driving means for the takeup roll 15 is so selected as to maintain the chart taut with minimum paper on the takeup roll, and, hence, as the diameter increases, the speed will be adequate to apply through the frictional means a force which maintains the chart in tension throughout the subsequent operation.

A marker or pen 18 suitably driven by a cord or cable 19, known in the art as a violin string, is moved relative to the chart in response to any condition under measurement. In Fig. 1, a motor 20 through suitable gearing 20a and a drive shaft 21 rotates the violin string 19 to adjust the marker 18 in response to the magnitude of the condition, which as illustrated, may be a characteristic of a network which has been generally designated by the rectangle 22. Though any condition may be measured, it will be assumed that the network 22 is one affected by frequency, and further that the frequency-transmission characteristic thereof is to be recorded. A slidewire 23 driven by the motor 20 is arranged to balance the output of a frequency-measuring and converting system 24, commonly called a power level recorder, the details of which are disclosed in the Transactions of the A. I. E. E., Volume 59, pages 957–964 (1940).

With selected circuit constants for the network 22, the motor 16 is energized by operation of a reversing switch for rotation in a direction to rotate the chart-driving roll 13 in the clockwise direction. The motor 16 at the same time rotates a variable impedance, shown as a slidewire 26, relative to its associated contact to vary the frequency of an oscillator 27 supplying the network 22. The resultant characteristic curve 28 has been shown as substantially complete. In order to compare characteristic curve 28 with one resulting from a change of circuit constants in the network 22, the reversing switch 25 will be operated to reverse the direction of the motor 16 to rotate the chart-driving roll 13 in a counterclockwise direction. At the same time by a selective driving mechanism 29, there is a transfer of the driving connection from the chart-supporting means 15, 15a, to the chart-supporting means 14, 14a, to interchange their functions, the chart-supporting means 15 then being the supply roll and the chart-supporting means 14 then serving as a takeup roll. After the chart has been rewound to bring the initial part of curve 28 beneath the marker 18, the reversing switch 25 is moved to deenergize the motor 16 and the desired changes in the circuit constants of the network 22 are made. The reversing switch 25 then energizes motor 16 for clockwise rotation to produce a second characteristic curve which has been shown by the broken line 28a. This procedure will be repeated until the desired characteristic curve is obtained.

In addition to the foregoing application of the invention, it is sometimes desirable to move the chart in accordance with one variable while the marker is at the same time moved in accordance with another variable.

As shown in Fig. 2, the marker 18 is moved in accordance with the magnetizing force applied by a coil 30 to a magnetic structure 31 while the chart 10 is moved in accordance with the magnitude of the flux in the core 31 and threading coil 32. More particularly, a motor 33 through gearing 34 drives a contact 35 relative to a slidewire 36 to apply from a battery 37 to the coil 30 a current of variable magnitude and reversible polarity. The magnitude of the current develops across the shunt 38 a voltage which is measured by a suitable measuring system 39 which may be of the type fully disclosed in Letters Patent No. 2,113,164 to Williams. Such a measuring system includes means for controlling the motor 20 which is operated in sense and to extent corresponding with the change in voltage across the shunt 38. Similarly, the voltage developed across the coil 32 is measured by a system 40 similar to the system 39 and serves to control the sense and extent of rotation of a motor 41.

In operation, there will be recorded on the chart 10 a B—H curve of the material 31. Such hysteresis or B—H curves yield valuable information, and in accordance with Fig. 2 they can be readily obtained for different degrees of magnetization, the degree of magnetization being readily controlled as by adjustment of a resistor 42.

In plotting the hysteresis curve 43, it will be observed that the chart 10 is moved first in one direction and then in the other. As in the case of Fig. 1, the chart-supporting means 15 first serves as a reroll and then as a supply roll, while the chart-supporting means 14 first serves as a supply roll and then as a reroll, the chart 10 being maintained taut during both directions of rotation.

Again referring to Figs. 1 and 2, it is to be understood that the chart-driving means including the supply roll and the takeup roll have been shown in positions where the respective function may be observed with clarity. For details of a chart-supporting and driving mechanism as utilized in instruments embodying the present invention, reference may be had to Letters Patent No. 2,074,118 to Ross et al., particularly Fig. 5 thereof.

In Fig. 1 of the present application, it will be observed that the selective driving mechanism 29 includes a gear 50 supported by a pivoted arm 51 which is effective to swing the gear 50 from driving engagement with a gear 52, arranged to drive the chart-supporting means 15, into driving engagement with a gear 53 arranged to drive the chart-supporting means 14. The arm 51 may be either positively or frictionally actuated in accordance with the direction of rotation of the chart-driving roll 13. As shown, a chain 54 is threaded over sprocket wheels 55 and 56, the latter being secured to a stub shaft 57 on which the arm 51 is pivotally mounted. A gear 58 secured to stub shaft 57 is in driving relation with the gear 50. When the sprocket 56 is rotated in a clockwise direction by clockwise rotation of the shaft 13a, the gear 58 not only rotates the gear 50 in a counterclockwise direction but also develops on the arm 51 a torque which tends to move it in a clockwise direction to urge the gear 50 into engagement with the gear 52. It is to be further observed that friction developed between the upper end of arm 51 and the stub shaft 57 also tends to rotate the arm in a clockwise direction to maintain driving engagement between gears 50 and 52.

Upon reversal of rotation of shaft 13a and of chart-driving roll 13, the sprocket 56 will be driven in a counterclockwise direction, and due to the friction between the upper end of the arm 51 and the stub shaft 57 as well as the reactive force produced by gear 50 on the lower end of arm 51, the arm 51 will be rotated in the counterclockwise direction until the gear 50 meshes with gear 53 for positive drive of the chart-supporting means 14. Rotation of gear 58 in the counterclockwise direction produces clockwise rotation of gear 50 and counterclockwise direction of gear 53 so that the chart-supporting means 14 is driven in a counterclockwise direction to take up the chart as it is fed by the driving pins 11 and 12 of driving roll 13.

In the modification of the invention of Fig. 3, to be described more in detail hereinafter, there is provided an arrangement to control the frictional drag between the upper end of lever 51 and the stub shaft 57, and in accordance with the modification shown in detail in Figs. 5 and 5-A there is illustrated the modification in which there is control of the drag force on the gear 50 which causes it to swing the arm 51 in one direction or the other in selective drive of gears 52 and 53.

Referring now to Fig. 2, there is illustrated a selective driving mechanism 29 in which the transfer of the drive from one chart-support to the other is positive in action, and not dependent upon frictional drag. More particularly, the parts have been illustrated in positions characteristic of clockwise rotation of the sprocket wheel 56 and the driving gear 58. Upon reversal of rotation of sprocket wheel 56 and gear 58, the gear 50 will be rotated in a clockwise direction. Accordingly, a pawl 92 will apply through a rod 93 a force on the arm 51 to rotate it about shaft 57 in a counterclockwise direction, thereby to move the gear 50 out of engagement with gear 52 and into meshing and driving relationship with the gear 53. As soon as the gear 50 engages gear 53, additional rotation of gear 50 will be permitted by the pawl 92 which thereafter slides over the outer ends of the gear teeth, the pawl being biased against them by a spring 95 extending between a rod 96 and a mounting pin 97 carried by the pawl.

In this modification of the invention, the action is positive by reason of the engagement of the pointed end of the pawl with the gear teeth and the reaction on the rod 93 in moving the arm 51 between its two driving positions. It will be observed that the pawl is pivotally mounted on the end of a rod 94 which extends through a transversely elongated opening 51d and which rod 94 is supported as a cantilever by a supporting member 98. The sides of the opening 51d may serve as stops to limit the pivotal movement of the arm 51 and thus predetermine the degree of meshing engagement of the gears.

In Fig. 3 the upper end of arm 51 is divided into two complementary parts 51a and 51b which are clamped to an enlarged section 57a of the stub shaft 57 as by springs 59, 59. These springs encircle adjusting screws 60 and 61 which have their lower ends threaded into the portion 51a of arm 51, the portion 51b being free to slide on the stems of adjusting screws 60 and 61. By adjusting the screws 60 and 61 to increase or decrease the pressure between end portions 51a and 51b of arm 51, the force developed in moving the gear 50 from one driving position to another may be readily controlled. After the gear 50 is moved into one driving position or the other, there will be slippage between the enlarged portion 57a of shaft 57 and the arm members 51a and 51b. Nevertheless, this may be tolerated and has been found to be a satisfactory arrangement.

Referring to Fig. 4, a core 15d has wound thereon the chart 10. The core 15d, which is preferably a hollow tube of hard material such as compressed cardboard, has been illustrated with a part of the chart 10 wound thereon. The core 15d has extending into the hollow ends thereof complementary mid-portions or central sections 15e, 15e of flanges 15a, 15a. The left-hand flange 15a is secured to a push rod 77 having a handle or knob 78 at the outer end thereof. A spring 79 engages a part of the frame 80 at one end and at its opposite end presses the flange 15a against the roll of paper 10.

At the opposite end of the core 15d, the right-hand flange 15a is secured to a stub shaft 81 which carries the gear 52. Between the frame or journal support 80 for the stub shaft 81 is disposed a spacer 82. It will be observed that the mid-portion or complementary section 15e of flange 15a has a key 83 extending into a keyway of the core 15d to form a positive driving connection therewith.

To remove a roll of paper, it is only necessary to grasp the knob or handle 78 and pull the flange 15a away from the core 15d. The chart roll 10 may then be withdrawn and an empty core installed in its place or there may be installed a new chart roll to form the supply for further operation. It is to be understood that similar provisions are made for the chart-support 14 and either an empty core or a core with a new chart wound thereon may be inserted and removed as desired.

In certain of the foregoing modifications of the invention it will be remembered that the driving gear 50 was urged into meshing relationship with either gear 52 or 53, the extent of transfer movement of the gear 50 being limited only by the engagement of the teeth of that gear with the cooperating teeth of another gear. While such an arrangement may be used, it will be seen from Fig. 5 that the movement of gear 50 may be limited so as to provide clearance between the roots of the teeth of one gear and the projections of the other gear as by stops 84 and 85, these stops being positioned so that there is substantial meshing engagement between gears 50 and 52, or between 50 and 53, but without transmittal of frictional pressure to the gears.

The selective driving mechanism of Fig. 5 includes an additional gear 86 loosely mounted upon a stub shaft 87 carried at one end by a stationary support 88. The shaft 87 is held stationary in support 88 and is encircled by a compression spring 89 arranged to press the gear 86 against an enlarged head 90, Fig. 5-A, which may be either integral with shaft 87 or threaded thereon. The spring 89 presses against a washer or disk 91 to urge the gear against the enlarged head 90, and thus there is developed a frictional drag on the gear 86. This frictional drag in opposing rotation of gear 50 results in the production of a component of force which rotates the arm 51 in the desired direction. For example, clockwise rotation of gear 58 rotates gear 50 in a counterclockwise direction and rotates the gear 86 in a clockwise direction against the frictional force already discussed. The result is the development on the arm 51 of a force which swings it in the direction bodily to move the gear 50 towards and into meshing engagement with the gear 52, the movement being limited by the engagement of the lower end 51c of the arm 51 with the stop 84. Upon reversal of rotation of gear 58, the gear 50 and arm 51 swings in a counterclockwise direction until the lower end 51c of arm 51 engages stop 85 at which time the gear 50 is in meshing relation with the gear 53.

Reference has already been made to the frictional drive 17 illustrated in Figs. 1 and 2. The device comprising the frictional drive is shown in detail in Figs. 1-A and 1-B where it will be observed the sprocket 55 is secured, as by screws 64, to a rotatable structure 63 formed of a material having a low coefficient of friction. The material of the rotatable structure or bearing member 63 may be a synthetic base for rayon now sold to the trade under the trade-name "Nylon", the material including a group of thermoplastic long chain superpolyamides produced by polymerization, this material being well known to those skilled in the art. Nylon is suitable because of its low coefficient of friction which, of course, is desirable for its function as a bearing on the shaft 13a for the sprocket 55. Another suitable material is an oil-impregnated Phosphor bronze available on the market under the trade-name "Oilite."

The rotatable structure or bearing 63 has an outer cylindrical surface about which there is clamped two elements 65 and 66 as by springs 67 respectively surrounding bolts 68 and 69 which freely extend through the element 65 and threadedly engage the element 66. From suitable structure, such as a hand-wheel 70 secured to the shaft 13a, there extends two driving pins 71 and 72. As shown, these pins extend into and between the elements 65 and 66. Rotation of the shaft and of the hand-wheel 70 rotates the elements 65 and 66, the friction between the inner surfaces thereof and of the outer cylindrical surface of the bearing member 63 being effective to rotate the bearing 63 and to limit the torque which may be applied to the sprocket 55. The gear ratio between the shaft 13a and the respective rolls 14 and 15 is such that for an empty roll, the speed will not only be adequate to prevent slack in the chart 10 but also to result in some slippage between elements 65 and 66 and the outer surface of bearing structure 63.

As the chart diameter on a selected takeup roll increases, the slippage increases, but the torque applied to the sprocket 55 remains constant, or very closely so, and thus maintains a predetermined tension on the chart 10 for all conditions of operation. By utilizing a material having the low coefficient of friction which characterizes nylon and oilite, a good bearing is not only provided for the sprocket 55 but the low coefficient of friction results in a driving torque on sprocket 55, and, hence, the tension in the chart 10, which is exceedingly uniform. There is little, if any, change in the value of that torque upon reversal of rotation of the shaft 13a and of the sprocket 55. The foregoing is important since with materials having materially higher coefficients of friction, the frictional force developed is variable and may greatly change as between forward and reverse operations. The elimination of such variable friction is particularly important where the chart is being driven in response to variation in the magnitude of a condition to avoid indeterminate changes in the mechanical characteristics of the system which would produce, if present, a greater tendency to overshoot and undershoot the balance point. Another characteristic of nylon and oilite is that neither is materially effected by change of ambient temperature. The relative stability of the coefficient of friction of each, with large changes in ambient temperature, is of course highly desirable, where the objective is to maintain constant torque on the sprocket or driven element 55.

While there has been illustrated several modifications of the invention, it is to be understood that features of one modification may be used in connection with other modifications and that further modifications may be made within the scope of the appended claims.

What is claimed is:

1. In combination, a recording instrument having marking means for a chart, a chart-driving roll, a reversible motor for driving said roll in one direction or the other, a control system for said motor including means responsive to the magnitude of a condition for controlling the energization of said motor for rotation in said one direction or the other depending upon the direction of change in magnitude of the condition, rotatable supports respectively forming a chart-reroll and a chart-supply roll, selective driving mechanism disposed adjacent said rotatable supports and including a member driven by said motor and pivotally supported for movement between a driving connection with one rotatable support and a driving connection with the other rotatable support upon reversal of rotation of said motor thereby to interchange the function of the chart-supply roll and the chart-reroll upon each reversal of said motor.

2. In combination, a recording instrument having a driving roll for a chart, a reversible motor for driving said roll in one direction or the other, a control system for said motor including means responsive to the magnitude of a condition for controlling the energization of said motor for rotation in said one direction or the other depending upon the direction of change in magnitude of the condition, rotatable supports respectively forming a chart-reroll and a chart-supply roll, selective driving mechanism disposed adjacent said rotatable supports and including a driven member driven by said motor and pivotally supported for movement between a driving connection with one rotatable support and a driving connection with the other rotatable support upon reversal of rotation of said motor thereby to interchange the function of the chart-supply roll and the chart-reroll upon each reversal of said motor, marking means for the chart, structure supporting said marking means for movement relative to the chart in a direction at right angles to the direction of movement of the chart under the control of said motor, and means responsive to the magnitude of another condition for controlling the movement of said marker relative to said chart to produce a record representative of the relationship between the two conditions under measurement.

3. In combination, a recording instrument having a chart-driving roll, a reversible motor for driving said roll in one direction or the other, a control system for said motor including means responsive to the magnitude of a condition for controlling the energization of said motor for rotation in said one direction or the other depending upon the direction of change in magnitude of the condition, rotatable supports respectively forming a chart-reroll and a chart-supply roll, selective driving mechanism disposed adjacent said rotatable supports and including a driven member driven by said motor, a pivoted arm supporting said driven member for movement between a driving connection with one rotatable support and a driving connection with the other rotatable support, a rotatable member driven by said driven member, friction means associated with said rotatable member for developing a turning moment on said arm which reverses in direction upon reversal of rotation of said motor to interchange the function of the chart-supply roll and the chart-reroll upon each reversal of said motor, marking means for the chart, structure supporting said marking means for movement relative to the chart in a direction at right angles to the direction of movement of the chart under the control of said motor, and means responsive to the magnitude of another condition for controlling the movement of said marker relative to said chart to produce a record representative of the relationship between the two conditions under measurement.

4. In combination, a recording instrument having a chart-driving roll, a reversible motor for driving said roll in one direction or the other, a control system for said motor including means responsive to the magnitude of a condition for controlling the energization of said motor for rotation in said one direction or the other depending upon the direction of change in magnitude of the condition, rotatable supports respectively forming a chart-reroll and a chart-supply roll, selective driving mechanism disposed adjacent said rotatable supports and including a member driven by said motor, a pivoted arm supporting said driven member for movement between a driving connection with one rotatable support and a driving connection with the other rotatable support, a pawl engaging said driven member, said pawl upon reversal of rotation of said motor being driven from a first position to a second position and a driving connection between said pawl and said arm for moving it and said driven member carried thereby to interchange the function of the chart-supply roll and the chart-reroll upon each reversal of said motor, marking means for the chart, structure supporting said marking means for movement relative to the chart in a direction at right angles to the direction of movement of the chart under the control of said motor, and means responsive to the magnitude of another condition for controlling the movement of said marker relative to said chart to produce a record representative of the relationship between the two conditions under measurement.

5. In combination, a recording instrument having a driving roll for a chart, a reversible motor for driving said roll in one direction or the other, a control system for said motor including means responsive to the magnitude of a condition for controlling the energization of said motor for rotation in said one direction or the other depending upon the direction of change in magnitude of the condition, rotatable supports respectively forming a chart-reroll and a chart-supply roll, selective driving mechanism disposed adjacent said rotatable supports and including a driven member driven by said motor and pivotally supported for movement between a driving connection with one rotatable support and a driving connection with the other rotatable support upon reversal of rotation of said motor thereby to interchange the function of the chart-supply roll and the chart-reroll upon each reversal of said motor, marking means for the chart, structure supporting said marking means for movement relative to the chart in a direction at right angles to the direction of movement of the chart under the control of said motor, means responsive to the magnitude of another condition for controlling the movement of said marker relative to said chart to produce a record representative of the relationship between the two conditions under measurement, and structure forming a friction overdrive between said motor and said rotatable supports to limit the torque applied by said motor to the rotatable support functioning as a reroll for the chart to maintain the chart under tension for either direction of movement thereof by said motor.

6. In a recording instrument having a chart-supply roll, a chart-takeup roll, a chart-driving roll and including a marking means for the chart, a gear drive mechanism therefor comprising a pair of load gears having fixed axial positions and respectively in driving engagement with said chart-supply roll and said chart-takeup roll, a third gear having a fixed axial position disposed in driving engagement with said chart-driving roll and adapted to be rotated in either direction, a gear having an axis movable to two positions and in mesh with said third gear, said movable axis gear meshing with one of said pair of load gears when in one of said two positions and meshing with the other of said pair of load gears when in the other of said two positions for interchanging the functions of said chart-takeup roll and a chart-supply roll and said bracket on which said movable axis gear is movable, a drag gear, means at all times supporting said drag gear in mesh with said movable axis gear, and means for placing drag on the rotation of said drag gear, said drag gear preventing free rotation of said movable axis gear during movement thereof for supplying a force to maintain said movable axis gear in mesh with said load gears.

7. In a recording instrument having a chart-supply roll, a chart-takeup roll, a chart-driving roll and including a marking means for the chart, a gear drive mechanism therefor comprising a pair of load gears having fixed axial positions and respectively in driving engagement with said chart-supply roll and said chart-takeup roll, a third gear having a fixed axial position disposed in driving engagement with said chart-driving roll and adapted to be rotated in either direction, a shiftable gear, structure supporting said shiftable gear for movement of the center of rotation thereof about the axis of said third gear into selective meshing engagement with one of said load gears, said shiftable gear upon movement from meshing engagement from one to the other of said load gears interchanging the functions of said chart-takeup roll and said chart-supply roll, a drag gear, structure at all times supporting said drag gear in mesh with said shiftable gear on the side thereof opposite said driving gear, and means for placing drag on the rotation of said drag gear, said drag gear preventing free rotation of said shiftable gear during movement thereof and for supplying a force to maintain said shiftable gear in mesh with the selected one of said load gears.

8. In a recording instrument having a chart-supply roll, a chart-takeup roll, a chart-driving roll and including a marking means for the chart, a gear drive mechanism therefor comprising a pair of load gears having fixed axial positions and respectively in driving engagement with said chart-supply roll and said chart-takeup roll, a third gear having a fixed axial position disposed in driving engagement with said chart-driving roll and adapted to be rotated in either direction, a gear having an axis movable to two positions and in mesh with said third gear, said movable axis gear meshing with one of said pair of load gears when in one of said two positions and meshing with the other of said pair of load gears when in the other of said two positions for interchanging the functions of said chart-takeup roll and said chart-supply roll, a bracket on which said movable axis gear is movable, a pawl, means at all times supporting said pawl for meshing engagement with said movable axis gear, and a positive driving connection between said pawl and said bracket for moving said movable axis gear from one to the other of its two positions upon reversal of rotation of said third gear, the movement of said movable axis gear into one of its two positions automatically disengaging said positive drive connection.

References Cited in the file of this patent

UNITED STATES PATENTS

| Number | Name | Date |
|---|---|---|
| 1,371,719 | Alber | Mar. 15, 1921 |
| 1,812,083 | Damerell | June 30, 1931 |
| 1,817,432 | Angus | Aug. 4, 1931 |
| 1,967,072 | Young | July 17, 1934 |
| 2,012,437 | Segal | Aug. 27, 1935 |
| 2,275,497 | Berndt | Mar. 10, 1942 |
| 2,346,032 | Kinnucan | Apr. 4, 1944 |
| 2,391,735 | Orshansky | Dec. 25, 1945 |
| 2,472,925 | Space | June 14, 1949 |
| 2,479,518 | Scherbatskoy | Aug. 16, 1949 |